United States Patent
McKaigue et al.

(10) Patent No.: US 12,351,993 B2
(45) Date of Patent: Jul. 8, 2025

(54) ROAD PLATE MOVING SYSTEM AND METHOD

(71) Applicant: FER-PAL CONSTRUCTION, LTD., Toronto (CA)

(72) Inventors: Shaun Kendrick McKaigue, Ontario (CA); Vadim Kosseniouk, Ontario (CA)

(73) Assignee: FER-PAL CONSTRUCTION, LTD., Toronto (CA)

( * ) Notice: Subject to any disclaimer, the term of this patent is extended or adjusted under 35 U.S.C. 154(b) by 769 days.

(21) Appl. No.: 17/700,044

(22) Filed: Mar. 21, 2022

(65) Prior Publication Data

US 2023/0084260 A1 Mar. 16, 2023

Related U.S. Application Data

(63) Continuation-in-part of application No. 17/507,961, filed on Oct. 22, 2021.

(30) Foreign Application Priority Data

Sep. 13, 2021 (CA) ................. CA 3130501

(51) Int. Cl.
  *E01C 19/50* (2006.01)
  *B60P 1/02* (2006.01)
  (Continued)

(52) U.S. Cl.
  CPC ............... *E01C 19/52* (2013.01); *B60P 1/02* (2013.01); *E01C 11/005* (2013.01); *E01C 9/083* (2013.01)

(58) Field of Classification Search
  CPC ........ E01C 9/083; E01C 11/005; E01C 19/52; B60P 1/02
  (Continued)

(56) References Cited

U.S. PATENT DOCUMENTS 4,826,388 A 5/1989 Golding
4,860,841 A 8/1989 Sacco
(Continued)

FOREIGN PATENT DOCUMENTS

CN 108173161 A 6/2018
CN 109052271 A 12/2018
(Continued)

OTHER PUBLICATIONS

The CM 3 Compact Modular Vacuum Lifting System; 3 pages.
(Continued)

*Primary Examiner* — Raymond W Addie
(74) *Attorney, Agent, or Firm* — Kramer & Amado, P.C.

(57) ABSTRACT

A road plate moving system and method is disclosed that makes it easier, safer, and more economical to move road plates. A frame detachably attaches to a road plate at the centre of the road plate, and the frame is detachably attached to a vehicle, and the frame is attached to rollers that straddle the road plate and are configured to move in the desired direction of travel. Each roller has a lifting mechanism to adjust the height of the frame relative to the bottom of the rollers. In use, the frame is attached to the road plate, and the road plate is lifted off the ground by the rollers lifting the frame, and the frame and road plate are pulled forward or backwards by the vehicle to move the road plate, which is then lowered to the ground. In a second embodiment, the road plate is lifted by a lifter located above the centre of the road plate.

20 Claims, 11 Drawing Sheets

(51) Int. Cl.
*E01C 11/00* (2006.01)
*E01C 19/52* (2006.01)
*E01C 9/08* (2006.01)

(58) Field of Classification Search
USPC .................................................. 404/73, 83
See application file for complete search history.

(56) References Cited

U.S. PATENT DOCUMENTS

| | | | |
|---|---|---|---|
| 4,928,927 A | 5/1990 | Frederick | |
| 5,035,336 A | 7/1991 | Schmitz et al. | |
| 5,211,526 A | 5/1993 | Robinette | |
| 5,458,435 A | 10/1995 | Kohno | |
| 5,725,070 A | 3/1998 | Eldred | |
| 6,551,017 B1 | 4/2003 | Strassman | |
| 6,899,238 B2 | 5/2005 | Austin | |
| 6,945,742 B2 | 9/2005 | Roberts | |
| 7,731,451 B2 * | 6/2010 | Roberts | B66F 19/005 404/86 |
| 9,290,370 B1 | 3/2016 | Panio | |
| 2010/0226742 A1 * | 9/2010 | Ladd | B66F 9/0655 414/495 |
| 2014/0301819 A1 | 10/2014 | Panio | |
| 2018/0057334 A1 | 3/2018 | Poczciwinski | |
| 2024/0076171 A1 | 3/2024 | Standish | |

FOREIGN PATENT DOCUMENTS

| | | |
|---|---|---|
| CN | 211110658 U | 7/2020 |
| GB | 2426500 A | 4/2006 |
| KR | 101715922 B1 | 7/2016 |
| WO | 0240390 A1 | 5/2002 |

OTHER PUBLICATIONS

English translation of CN108173161A; dated Aug. 28, 2020; 6 pages.
English translation of CN109052271A; dated Aug. 28, 2020; 9 pages.
English translation of CN211110658U; dated Aug. 28, 2020; 4 pages.
English translation of KR101715922B1; 8 pages.

* cited by examiner

ROAD PLATE MOVING SYSTEM AND METHOD

FIELD OF THE INVENTION

The invention described herein is a system, apparatus and method, for moving road plates.

BACKGROUND OF THE INVENTION

When working underground, for example to perform work on underground pipes or conduits, it is sometimes necessary to cut a large hole in the pavement of a road. During times when the large hole is not being used, it is common to cover the hole with a road plate, generally to stop accidental or deliberate access to the hole, and often to allow the road to be reopened and allow vehicles to pass over the hole. When renewed access to the hole is required, the road plate needs to be removed. Depending upon the situation, it may be necessary to place and remove a road plate from a hole many times before the work is completed.

Road plates come in a variety of sizes and weights, but are generally large and heavy. Road plates are typically made of 1 inch or thicker steel, and can range in size from 5 foot by 8 foot (1.524 m by 2.4384 m) to 8 feet by 20 feet (2.4384 m by 6.096 m), and in weight from around 1634 lbs (0.817 US tons or 741 kg) to 6,534 lbs (3.2 US tons or 2963 kg). A typical road plate is 8 foot by ten foot and 3,267 lbs (1.6 US tons or 1482 kg).

To assist in movement, road plates typically have a lifting ring attached at the centre of the plate.

Road plates are unwieldy and difficult to move. Moving a road plate safely might involve several workers, and use of a crane or tractor or other motorized lifting equipment, and considerable time. Expensive cranes, tractors or other motorized equipment may be kept on site for several weeks for the sole purpose of removing and replacing the road plate every day.

Apparatuses are known for moving manhole covers, such as the apparatus described in U.S. Pat. No. 5,035,336 of Schmitz et al. However, removing a manhole involves different challenges to removing a road plate due to the road plate being of much greater size and weight and the size and weight not being symmetrically distributed (as a manhole cover is usually round, not rectangular). Also, such apparatuses focus on the removal of the manhole cover, but not replacing the manhole cover, which is generally not difficult. In contrast, replacing or repositioning a road plate is a non-trivial task.

SUMMARY OF THE INVENTION

It is desirable to have a system and equipment for moving road plates that increases safety, can be used by one or two workers, does not require the use of cranes, tractors or other heavy expensive equipment, for which the equipment can be stored and moved in a typical work truck, and which assists in both the removal and the repositioning of the road plate.

In accord with the present invention, there is provided a portable system for moving a road plate, comprising: a frame adapted to straddle the road plate; the frame including a first detachable attachment mechanism for detachable attachment to a road plate and configured so that the detachable attachment mechanism may be positioned over the centre of a road plate; the frame attached to at least two rollers that are configured to roll in a desired direction of movement; and a second detachable attachment mechanism for attaching the frame to a vehicle positioned to move in the desired direction of travel; and the at least two rollers bearing a lifting mechanism configured to raise and lower the height of the frame relative to the rollers.

In one aspect of the present invention, there is provided two rollers located on opposite sides of the road plate and a line drawn between the two rollers would form roughly a right angle with the desired direction of travel. In another aspect of the invention, the lifting mechanism comprises a jack screw. In still another aspect of the invention, the jack screw is adapted for manual operation using a handle. In yet another aspect of the invention, the jack screw is adapted for operation using a handheld power tool.

In another aspect of the invention the frame further comprises a downward protruding member located circumferentially distant from the first detachable attachment mechanism, the downward protruding member bearing a third detachable attachment mechanism for detachable attachment to the road plate.

In accord with the present invention, there is provided a method for moving a road plate, comprising: providing a frame adapted to straddle the road plate; the frame including a first detachable attachment mechanism for detachable attachment to a road plate and configured so that the first detachable attachment mechanism may be positioned over the centre of a road plate; the frame attached to at least two rollers that are configured to roll in a desired direction of movement; and a second detachable attachment mechanism for detachably attaching the frame to a vehicle positioned to move in the desired direction of travel; and the at least two rollers bearing a lifting mechanism for raising and lowering the frame relative to the rollers; wherein in operation: the frame is detachably attached to a vehicle positioned to move in the desired direction of travel using the second detachable attachment mechanism; the frame is detachably attached to the road plate using the first detachable attachment mechanism; the frame and road plate are lifted by activating the lifting mechanism; the vehicle moves in the desired direction of travel, thus moving the road plate; the vehicle stops at the desired location; and the lifting mechanism is activated to lower the frame and road plate.

In an aspect of the invention, the step of the vehicle moving in the desired direction of travel, thus moving the road plate, further comprises stopping the vehicle and adjusting the lifting mechanism and the vehicle resuming movement in the desired direction of travel. In Another aspect of the invention, the frame further comprises a downward protruding member located circumferentially distant from the first detachable attachment mechanism, the downward protruding member bearing a third detachable attachment mechanism for detachable attaching to the road plate, and in operation the third detachable attachment mechanism attaches to the road plate while it is being moved, and then detaches from the road plate when the road plate is lowered.

In accord with the present invention, there is provided a portable system for moving a road plate, comprising: a frame adapted to straddle the road plate; the frame configured so that a lifter connected to the frame may be positioned over the centre of a road plate; the frame attached to at least two rollers that are configured to roll in a desired direction of movement; and a first detachable attachment mechanism for detachably attaching the frame to a vehicle positioned to move in the desired direction of travel; and the lifter attached to a second detachably attachment mechanism for detachably attaching the lifter to the centre of the road plate. In an aspect the invention, the frame has a downward protruding member located circumferentially distant from the lifter, the downward protruding member bearing a third detachable attachment mechanism for detachable attachment to the road plate.

In accord with the present invention, there is provided a method for moving a road plate, comprising: providing a frame adapted to straddle the road plate; the frame configured so that a lifter connected to the frame may be positioned over the centre of a road plate; the frame attached to at least two rollers that are configured to roll in a desired direction of movement; and a first detachable attachment mechanism for detachably attaching to a vehicle positioned to move in the desired direction of travel; and the lifter attached to a second detachable attachment mechanism for detachably attaching the lifter to the centre of the road plate; wherein in operation: the frame is detachably attached to a vehicle positioned to move in the desired direction of travel using the first detachable attachment mechanism; the lifter is detachably attached to the road plate using the second detachable attachment mechanism; the road plate is lifted by the lifter; the vehicle moves in the desired direction of travel, thus moving the road plate; the vehicle stops at the desired location; and the lifter lowers the road plate.

In an aspect of the invention, the frame has a downward protruding member located circumferentially distant from the lifter, the downward protruding member bearing a third datable attachment mechanism for detachable attachment to the road plate, and in operation the step of the road plate being lifted by the lifter further comprises the downward protruding member detachably attaching to the road plate using the third detachable attachment mechanism, and the step of the lifter lowering the road plate further comprises the downward protruding member detaching from the road plate using the third detachable attachment mechanism. In another aspect of the invention, the downward protruding member is detachably attached to the road plate before the road plate is lifted by the lifter. In another aspect of the invention, the downward protruding member is detachably attached to the road plate after the road plate is lifted by the lifter.

In accordance with the present invention, there is provided a portable system for moving a road plate, comprising a vehicle provided with a winch and a cable, a first end of the cable being attached to the winch and the second end of the cable being fed through a guide roller and bearing a first detachable attachment mechanism for detachable attachment to a road plate; the vehicle being provided with at least one extension arm configured to extend the guide roller horizontally behind the vehicle, the at least one extension arm being long enough to extend the guide roller over the centre of a road plate; and the vehicle having a downward protruding member, the downward protruding member bearing a second detachable attachment mechanism for detachable attachment to the road plate.

In an aspect of the invention, the cable is a steel wire rope. In another aspect of the invention the cable is a chain. In another aspect of the invention, the downward protruding member comprises a jack screw. In still another aspect of the invention, the second detachable attachment mechanism is an electromagnet. In another aspect of the invention, the second detachable attachment mechanism is an eye and hook mechanism. In another aspect of the invention, the second detachable attachment mechanism is a chain mechanism. In yet another aspect of the invention, the first detachable attachment mechanism is a chain mechanism. In another aspect of the invention, the first detachable attachment mechanism is an eye and hook mechanism. In another aspect of the invention, the first detachable attachment mechanism is a chain mechanism.

In accordance with the present invention, there is provided a method of moving a road plate, comprising: providing a vehicle provided with a winch and a cable, a first end of the cable being attached to the winch and the second end of the cable being fed through a guide roller and bearing a first detachable attachment mechanism for detachable attachment to a road plate; the vehicle being provided with at least one extension arm configured to extend the guide roller horizontally behind the vehicle, the at least one extension arm being long enough to extend the guide roller over the centre of a road plate; and the vehicle having a downward protruding member the downward protruding member bearing a second detachable attachment mechanism for detachable attachment to the road plate; wherein in operation: the at least one extension arm is extended to move the guide roller over the centre of a road plate; the cable is unrolled from the winch so as to allow the first detachable attachment mechanism to detachably attach to the road plate; detachably attaching the first detachable attachment mechanism to the road plate; the cable is rolled onto the winch so as to raise the road plate off the ground and allow the second detachable attachment mechanism to detachably attach to the road plate; detachably attaching the second detachable attachment mechanism to the road plate; driving the vehicle to a new location for the road plate.

In an aspect of the invention, the method further comprises: detaching the second detachable attachment mechanism from the road plate; rolling the cable off the winch to lower the road plate to the ground; and detaching the first datable attachment mechanism from the road plate.

In another aspect of the invention, detachably attaching the second detachable attachment mechanism to the road plate comprises adjusting the height of the second detachable attachment mechanism and detachably attaching the second detachable attachment mechanism to the road plate. In another aspect of the invention, the downward protruding member comprises a jack screw and adjusting the height of the second detachable attachment mechanism comprises adjusting the height using the jack screw. In another aspect of the invention, the cable is a steel wire rope. In another aspect of the invention, the cable is a chain. In another aspect of the invention, the second detachable attachment mechanism is an electromagnet. In another aspect of the invention, the first detachable attachment mechanism is a chain mechanism. In another aspect of the invention, the first detachable attachment mechanism is an eye and hook mechanism. In another aspect of the invention, the first detachable attachment mechanism is a chain mechanism.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

Figure 1:
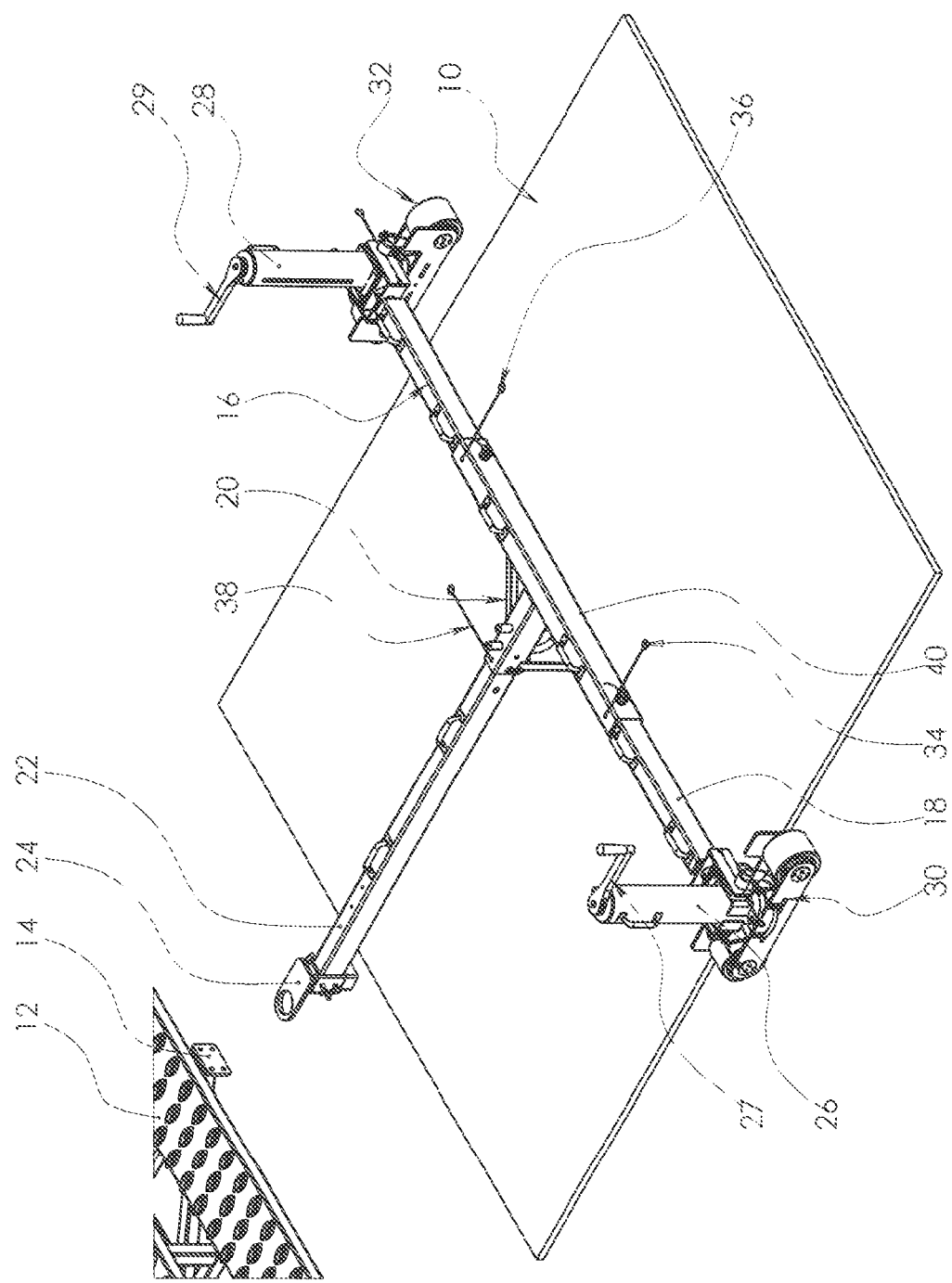
FIG. 1 is a perspective view of a first embodiment of the invention.
Figure 2:
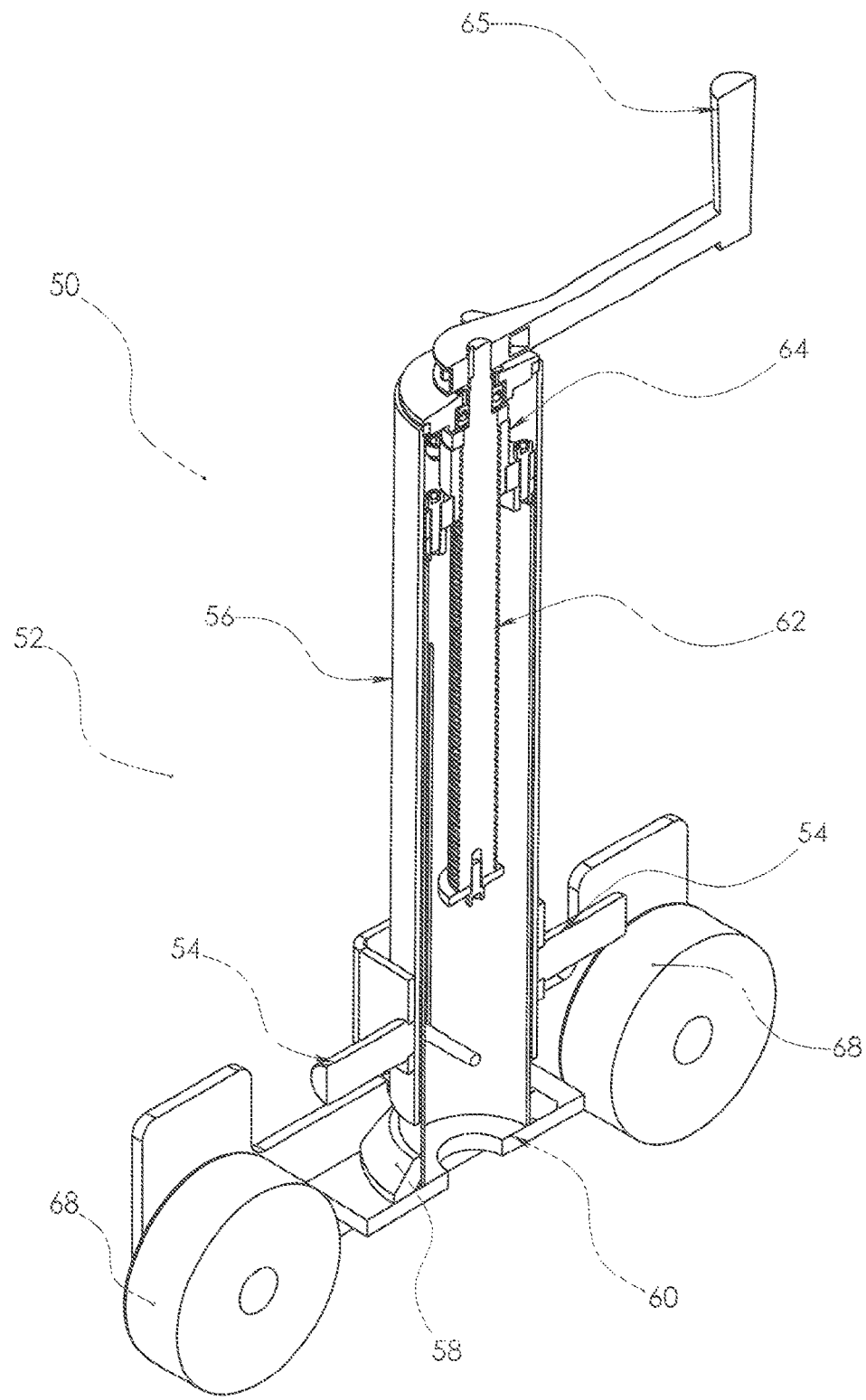
FIG. 2 is a cut-away perspective view of side view of a jack screw lifting mechanisms incorporated into rollers in the embodiment of the invention of FIG. 1.

FIG. 1 is a perspective view of an embodiment of the invention. Turning to FIGS. 1 and 2, there is a road plate 10. There is a vehicle 12 (only the rear of which is depicted in FIG. 1) which is equipped with half of a detachable attachment mechanism 14. There are adjustable cross bars 16 and 18 which interface with a lifting attachment bracket 20. Adjustable forward bar 22 also interfaces with lifting attachment bracket 20 and has the second half of a detachable attachment mechanism 24. Each end of the adjustable cross bars 16 and 18 connects to a lifting mechanism 26 which is integrated into roller 30 and lifting mechanism 28 which is integrated into roller 32. The lengths of the cross bars 16 and 18 and forward bar 22 can be adjusted using a pin and shaft systems 34, 36 and 38.

The lifting attachment bracket 20 is equipped with equipment 41 (pictured below in association with FIG. 5) to detachably attach to the lifting ring of road plate 10 at location 40. This equipment 41 can include chains, and eye and hook system, or an electromagnetic attachment. The equipment 41 for detachable attachment, as well as the frame formed by lifting attachment bracket 20 and arms 16, 18 and 22 and rollers 30 and 32 must be sufficiently strong to support the weight of the road plate 10 when road plate 10 is lifted off the ground.

The unevenness of the ground surrounding the road plate can be a major issue in moving and repositioning road plates as opposed to manholes due to the greater size of the road plate compared to the manhole, and because the cut into the ground which the road plate covers may be closer to the edge of the road than a typical manhole. In some cases, the ground could be of explicitly differing heights: for example, referring to FIG. 1, if roller 30 was located on a road and roller 32 was located on a curb alongside the road, or if roller 30 was located on a road and roller 32 was located on a hillside adjacent the road.

In the system of FIG. 1, such unevenness of the ground may be handled through the use of the lifting mechanisms 26 and 28. In a preferred embodiment, lifting mechanisms 26 and 28 are jack screw lifting mechanisms. In a still more preferred embodiment, the lifting mechanisms 26 and 28 are jack screw lifting mechanisms that can be activated by turning a handle. In another embodiment, the lifting mechanisms 26 and 28 are jack screw lifting mechanisms that can be activated by common handheld power tools such as air or electrical hand drills. In a preferred embodiment, lifting mechanisms 26 and 28 are integrated into rollers 20 and 32 and attach to arms 16 and 18. In another embodiment, lifting mechanisms 26 and 28 are attached to rollers 20 and 32 and also attached to arms 16 and 18.

Figure 3:
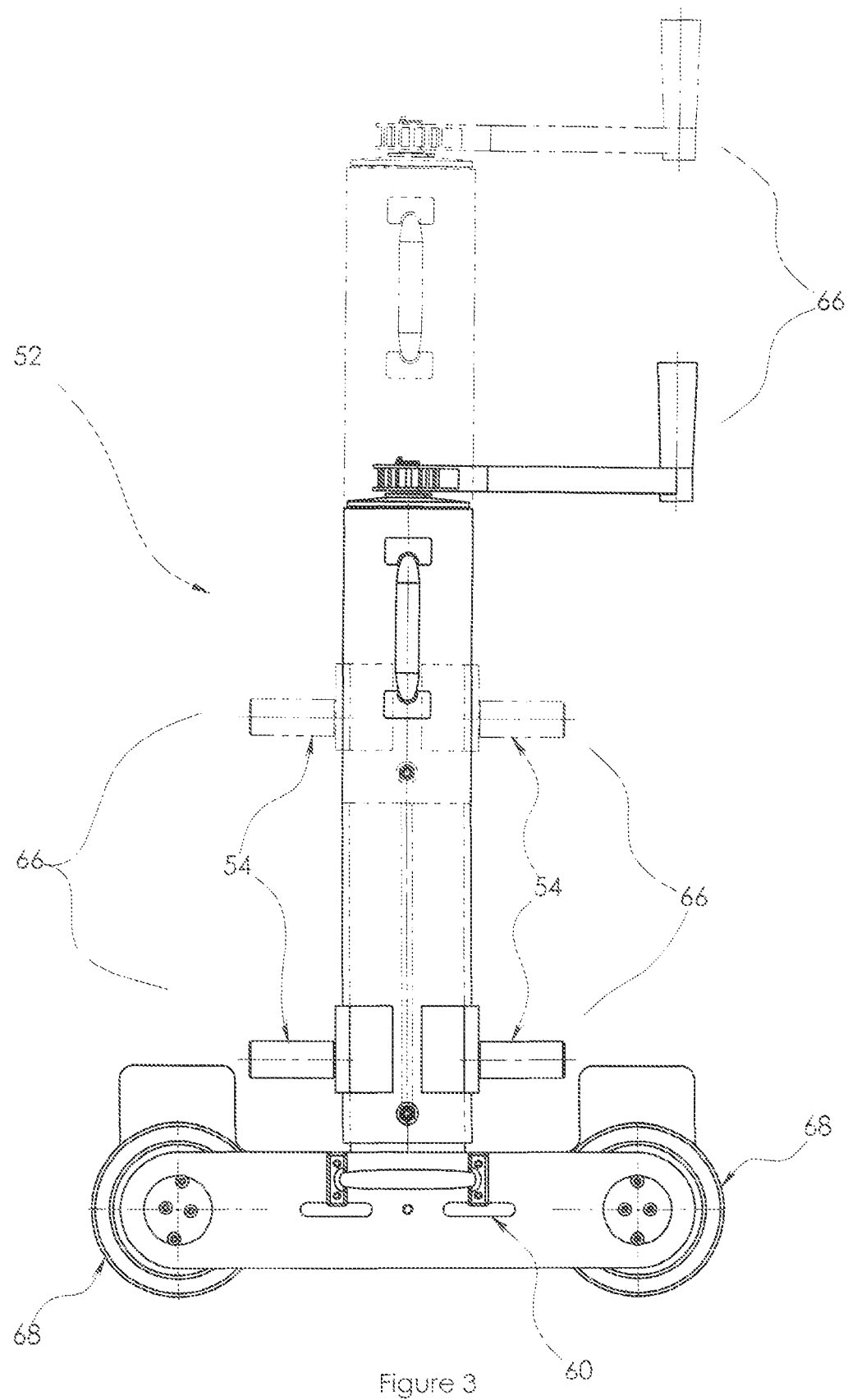
FIG. 3 is a side view of a jack screw lifting mechanisms incorporated into rollers in the embodiment of the invention of FIG. 1.

FIGS. 2 and 3 illustrate such jack screw lifting mechanisms incorporated into rollers. Turning to FIG. 2, there is a lifting mechanism and roller 50. The lifting mechanisms 52 have members 54 that are connected to (or part of) external sleeve 56 and are designed to connect with and support cross arms 16 and 18. Lifting mechanisms 52 have a base plate 58 that is configured to securely attach to or form an integral part of roller base 60. Attached to roller base 60 are at least two wheels 68.

The lifting mechanism 52 has a lead screw 62 that passes through lead nut 64. Screw 62 is adapted to be turned by handle 64. This lifting mechanism 52 can be operated by hand. In another embodiment, screw 62 is adapted too be turned by held power tools, such as air or electrical hand drills. In use, when handle 64 is turned in a first direction, lead screw 62 interacts with nut 64 to extend the external sleeve 56 of lifting mechanism 52 and so lift members 54. When handle 64 is turned in a second direction, lead screw 62 interacts with nut 64 to lower the external sleeve 56 of lifting mechanism 52 and so lower members 54.

Turning to FIG. 3, lifting mechanism 52 has a stroke (i.e. range of up and down movement) of 66. At the lowest position, members 54 are approximately 4-5 inches above bottom plate 60.

In use, the device and vehicle are placed on the road plate, generally as seen in FIG. 1. Pin and shaft systems 34, 36 and 38 are used to adjust forward arm 22 and cross bars 16 and 18 so that lifting attachment bracket 20 and equipment 41 (at point 40) are located over the centre of the road plate 10. The forward arm 22 is detachably attached to the vehicle 12 through a detachable attachment mechanism 14 and 24.

Figure 5:
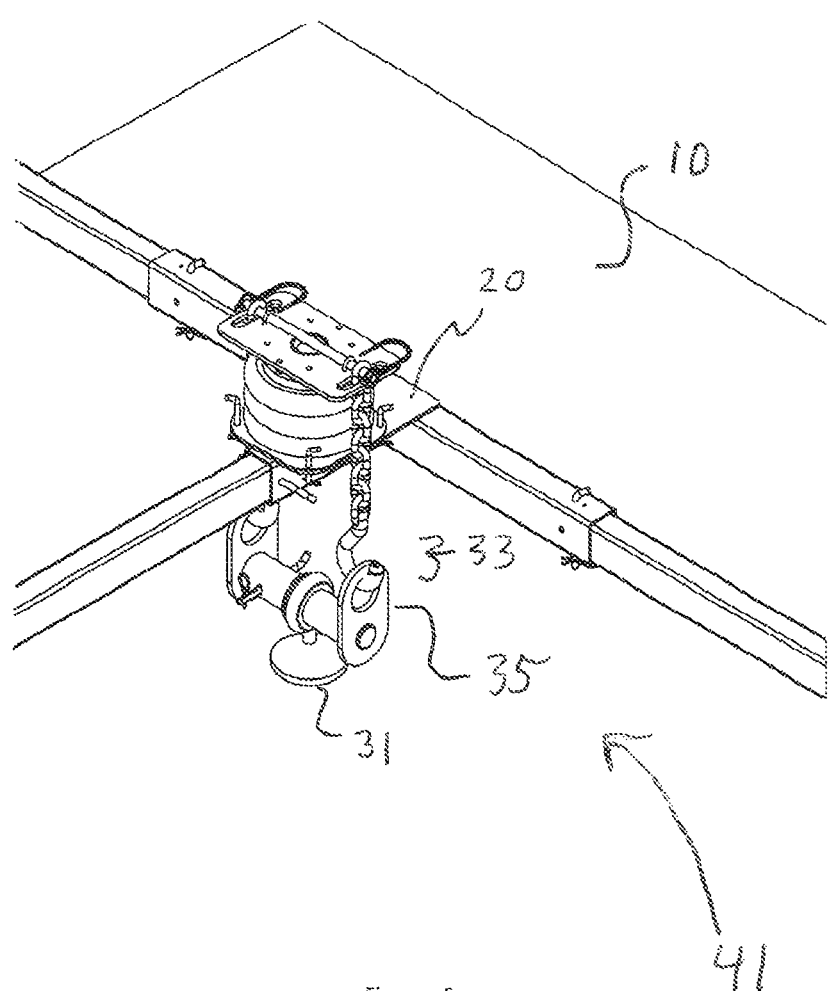
FIG. 5 illustrates one approach to detachably attaching the lifting attachment bracket to a road plate, in the embodiment of the invention of FIG. 1.

The lifting attachment bracket 20 is detachably attached to the road plate using equipment 41 at point 40 (please see FIGS. 1 and 5 and accompanying description).

Lifting mechanisms 26 and 28 are activated by turning the handles 27 and 29, thus lifting road plate 10 off the ground. Ideally, lifting mechanisms 26 and 28 are adjusted so that cross bars 16 and 18 remain in a roughly horizontal position. By using this approach, uneven ground to be traversed by roller bases 30 and 32 can be handled.

Once the road plate 10 has been lifted off the ground, the vehicle 12 is driven forward, to a desired location, and then lifting mechanisms 26 and 28 are adjusted to place the road plate 10 back on the ground. During the time when the vehicle is being driven forward, the vehicle can be stopped and the lifting mechanisms 16 and 28 adjusted to as to accommodate changes in the height of the ground under roller bases 30 and 32. To replace the road plate 10 in its original position, the same procedure is repeated, except that vehicle 12 reverses to move road plate 10 back to its original location.

In the embodiment shown if FIGS. 1-3, there are two rollers 30 and 32 placed to straddle the road plate 10. Rollers 30 and 32 are located on opposite sides of the road plate and a line drawn between the two rollers would form roughly a right angle with the desired direction of travel. In other embodiments, there are more than the two rollers 30 and 32 attached to the frame.

Figure 4:
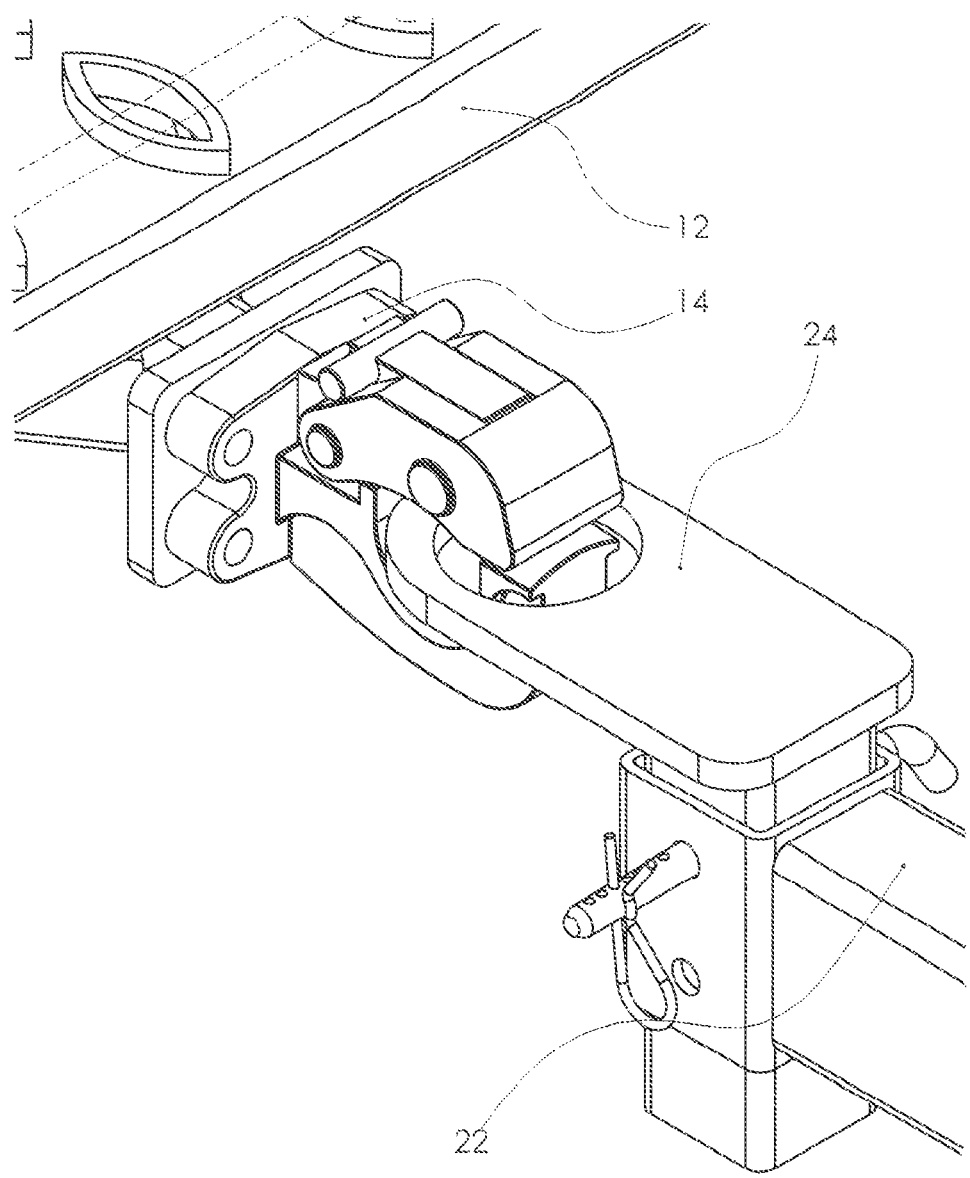
FIG. 4 illustrates one method and equipment for detachably attaching the forward arm of the frame to a vehicle 12 in the embodiment of the invention of FIG. 1 or FIG. 6.

FIG. 4 illustrates one method and equipment for detachably attaching the forward arm 22 to vehicle 12. Turning to FIG. 4, the two halves of a system for detachable attachment 14 and 24 are a clamp and eye system. However, person skilled in the art will know of other methods of detachable attachment that could be used, such as a chain system, or a hook and eye system.

The lifting attachment bracket 20 has to be detachably attached to the road plate 10 by equipment 41. Equipment 41 may incorporate any approach known to persons skilled in the art, as long as it is strong enough to hold a road plate and allows for safe detachable attachment by the users. FIG. 5 illustrates one such approach, where the lifting attachment bracket 20 is attached to the centre 31 of the road plate 10 by equipment 41 which is a hook and eye system 33 where the eye 35 is attached to the road plate, typically in the centre of the road plate. However, other detachable connectors such as chains attached directly to the attachment bracket 20 or chains attached to a hook attached to the attachment bracket 20 or an electromagnet may be used.

Figure 6:
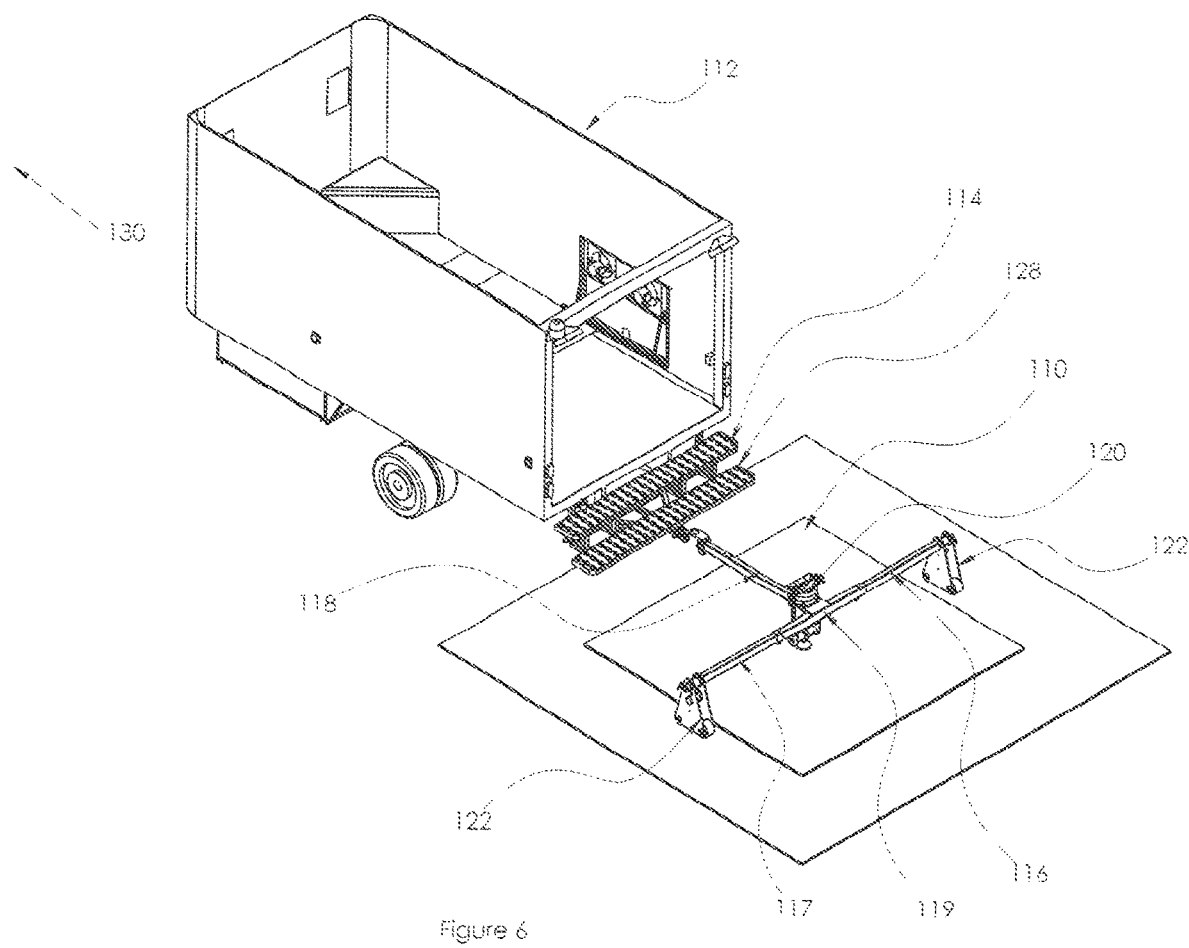
FIG. 6 is a perspective view of a second embodiment of the invention.
Figure 7:
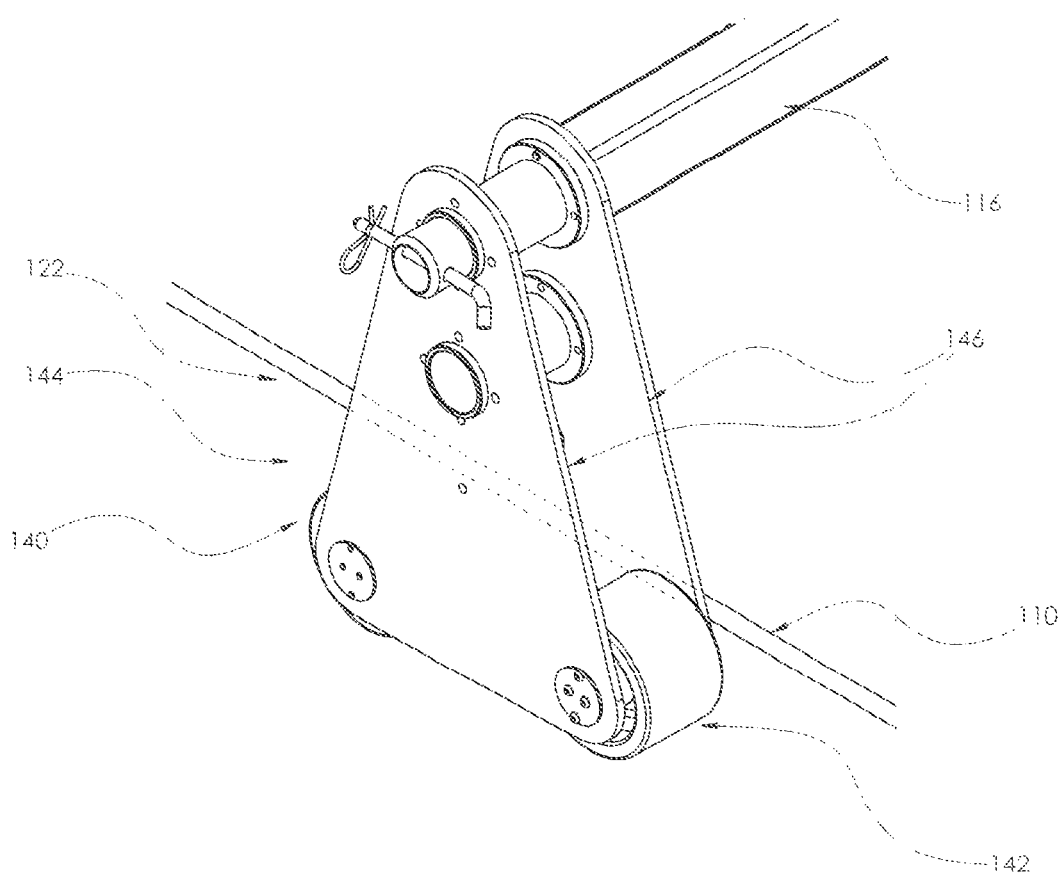
FIG. 7 is a perspective view of focusing on the rollers used in the embodiment of the invention of FIG. 6.

A second embodiment of the inventive device is illustrated in FIGS. 6 and 7. FIG. 6 is a perspective view, while FIG. 7 is an expanded view of the rollers. Turning to FIG. 6 the inventive device has a cross arms 116 and 117, and a forward beam 18, which together make a frame. The t-connection between the cross arms 116 and 117 and forward arm 118 which fit into lifting attachment bracket 119 which bears a lifter 120. The lifter 120 is connected to the road plate 110, typically by connection to the lifting ring or the like. Cross arms 116 and 117 are attached to two or more rollers 122. The frontward end of forward arm 118 has a detachable attachment mechanism 128 for connecting to the connection point 114 of vehicle 112.

In operation, the vehicle 112 and the inventive device are placed around road plate 110 as seen in FIG. 6. The lifter 120 is moved to a lowered position and detachably attached to the road plate 110. The lifter 120 is activated, pulling the road plate 110 off the ground.

Vehicle 112 then drives forward (the direction of arrow 130), pulling road plate 110 forward as it rolls on rollers 122. Once the road plate 110 has been moved the desired distance, lifter 120 lowers road plate 110.

To replace the road plate 110 in its original position, the same procedure is repeated, except that vehicle 112 reverses to move road plate 110 back to its original location.

In this embodiment, the lifter 120 is a hydraulic lift. In one embodiment, the lifter 12 is an AIRLIFT Cylinder with a 12 inch diameter. However, other lifters may be used as long as they can provide sufficient strength to lift a road plate, and are of sufficiently small form and weight to fit onto lifting attachment bracket 119.

Turning to FIG. 7, there is illustrated the rollers 122 that are connected to cross arm 117 and 116 and in use are placed on the ground on both sides of the road plate. Turning to FIG. 6, in this embodiment the rollers 122 are a triangular shape with forward and back wheels 140 and 142 connected to cross beam 16 with a triangular frame 144. As a practical matter, it should be appreciated that the ground over which rollers 122 (and the road plate 110) more will often be rough and uneven. The rollers 122 should be broad and stable enough to handle these conditions: in the case of the roller 122 illustrated in FIG. 6, the frame 144 can rotate around cross beam 116 at point 146, allowing the roller flexibility to adjust to rough ground. The ability of this roller to adjust can also be changed by widening the distance between wheels 140 and 142 at the bottom of the frame 144. In some cases, more wheels can be added. In another embodiment, the rollers 122 include a component to allow the wheels 140 and 142 to be raised and lowered vertically (or upwards) towards rotation point 146. This allows the system to be used in terrain where the ground on one side of the road plate is higher than on the other side, for example in cases where the road plate lies at the edge of the street and one of the rollers has to rest on a curb.

The forward arm 118 may be detachably attached to the vehicle 112 using any of the approaches illustrated or discussed above in relation to FIG. 4.

Figure 8:
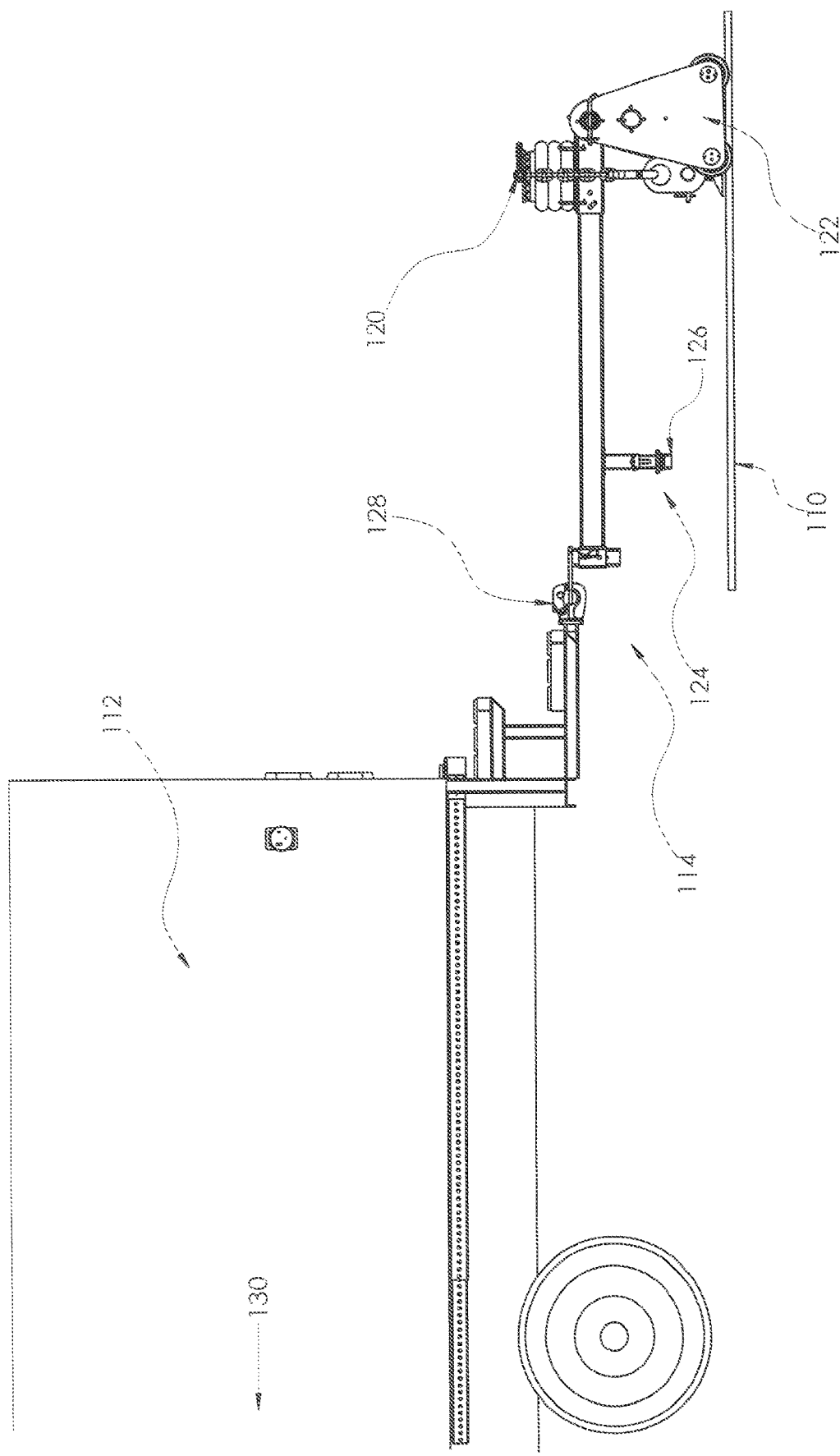
FIG. 8 is an illustration of a downward protruding member bearing a stabilization unit that may optionally be used in either the embodiment of FIG. 1 or the embodiment of FIG. 6.
Figure 9:
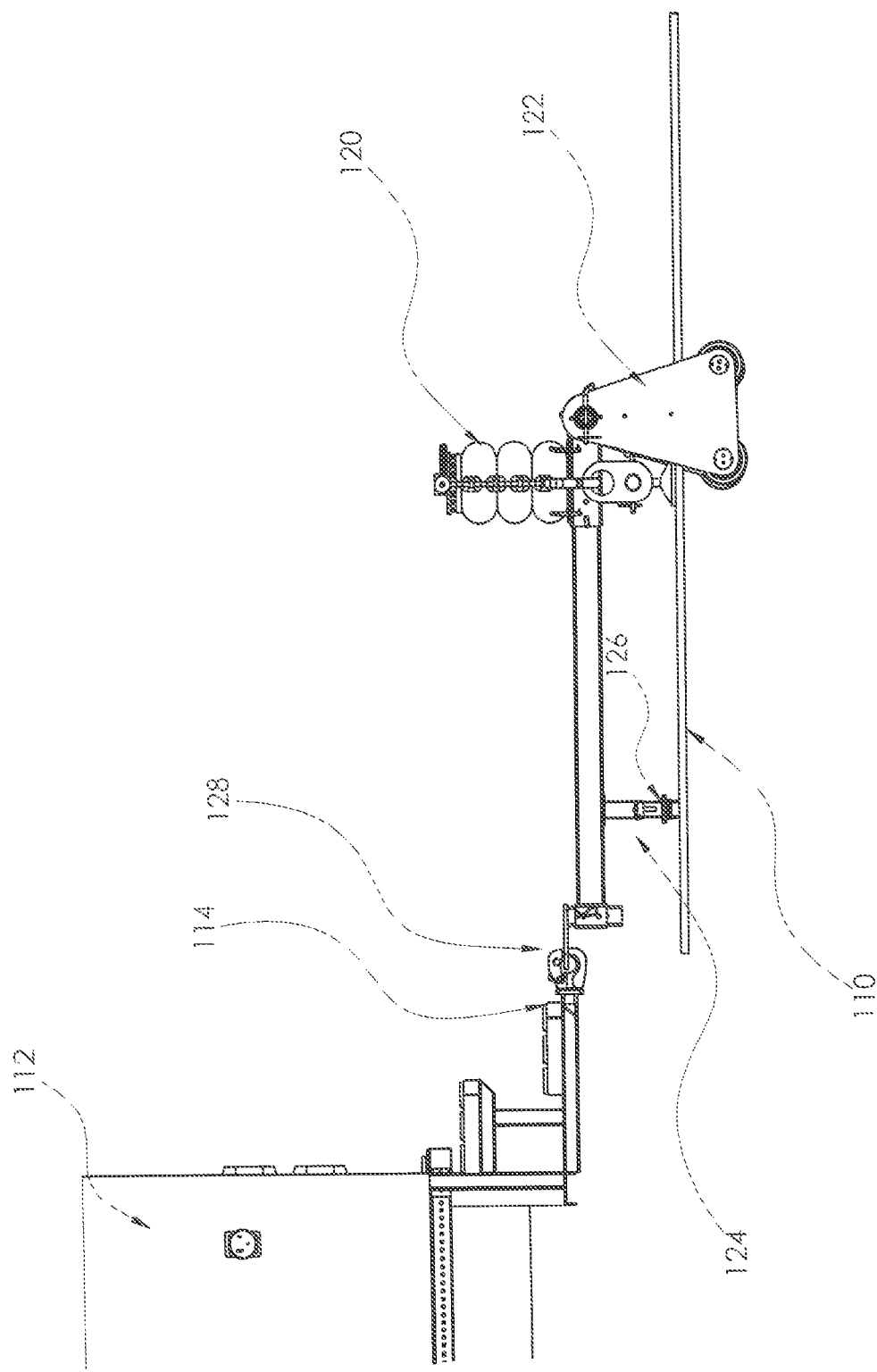
FIG. 9 is an illustration the use of the downward protruding member bearing a stabilization unit of FIG. 8 that may optionally be used in either the embodiment of FIG. 1 or the embodiment of FIG. 6.

In the case of either the embodiment illustrated in FIG. 1 or the embodiment illustrated in FIG. 6, there may optionally be added a downward protruding member from the forward arm that, when the road plate is in a raised position (i.e. raised off the ground), detachably attaches to the road plate and stabilizes the road plate. FIGS. 8 and 9 illustrate this option in the context of the embodiment of FIG. 6. Turning to FIG. 8, there is a downward protruding member 124 bearing a stabilization unit 126. As pictured, the stabilizing unit 126 is a magnet, preferably an electromagnet, and more preferably an electromagnet that can be turned on and off. Turning to FIG. 9, when in use when the road plate is lifted, stabilizing unit 126 engages with the road plate 110, preventing the road plate from having significant swing when it is moved. If stabilizing unit 126 is a magnet, then the stabilizing unit 126 engages with the road plate through magnetism. If stabilizing unit 126 is an electromagnet that can be turned on and off, then after moving road plate to its new position, the electromagnet can be turned off and the road plate lowered. If stabilizing unit 126 is an electromagnet or magnet that cannot be easily turned off, then the magnet strength has to be chosen so that is sufficiently strong to stop the road plate from swinging while the road plate is lifted by lifter 120 and the road plate is being moved, but weak enough to disengage when the road plate is lowered by lifter 120. Other stabilizing units could also be used, for example, if the road plate has a second ring (not the centre ring) available in a position where stabilizing unit could be a hook that engages the second ring.

Figure 10:
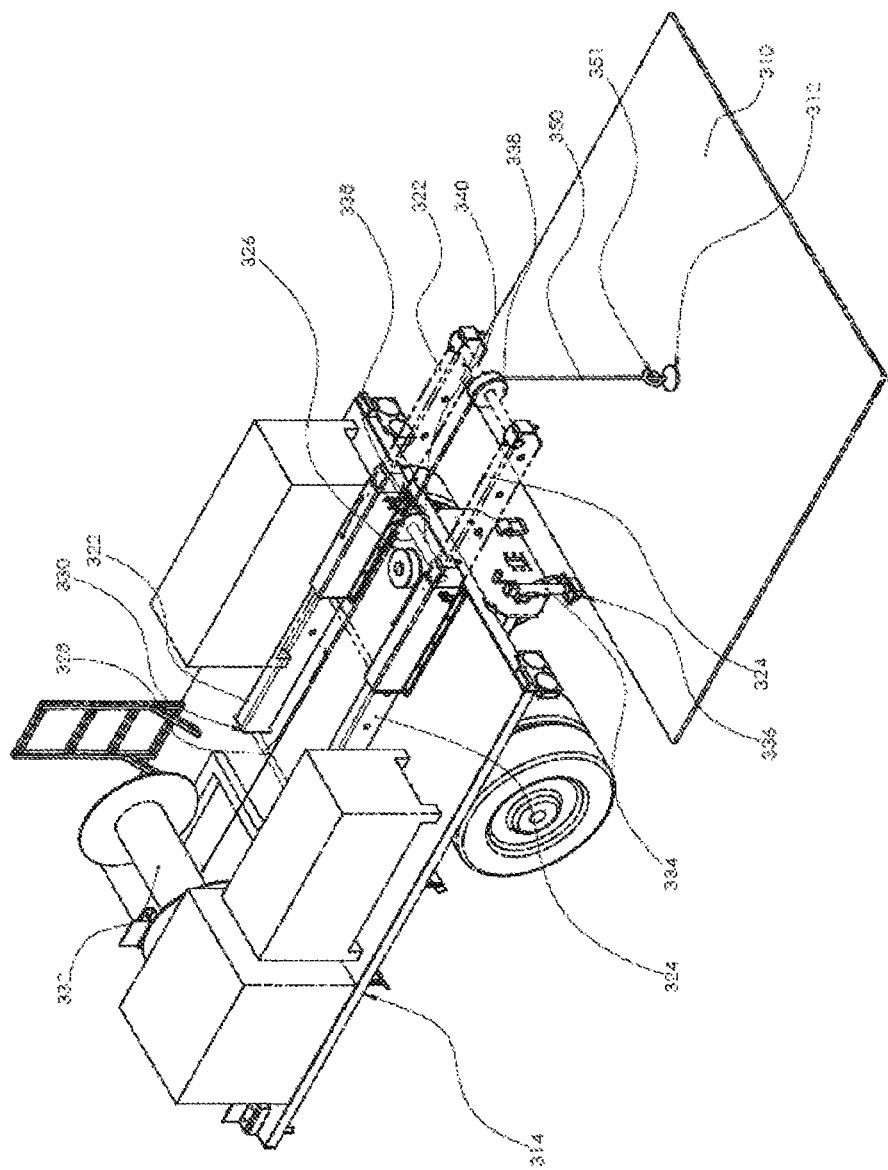
FIG. 10 is a perspective view of a third embodiment of the invention.
Figure 11:
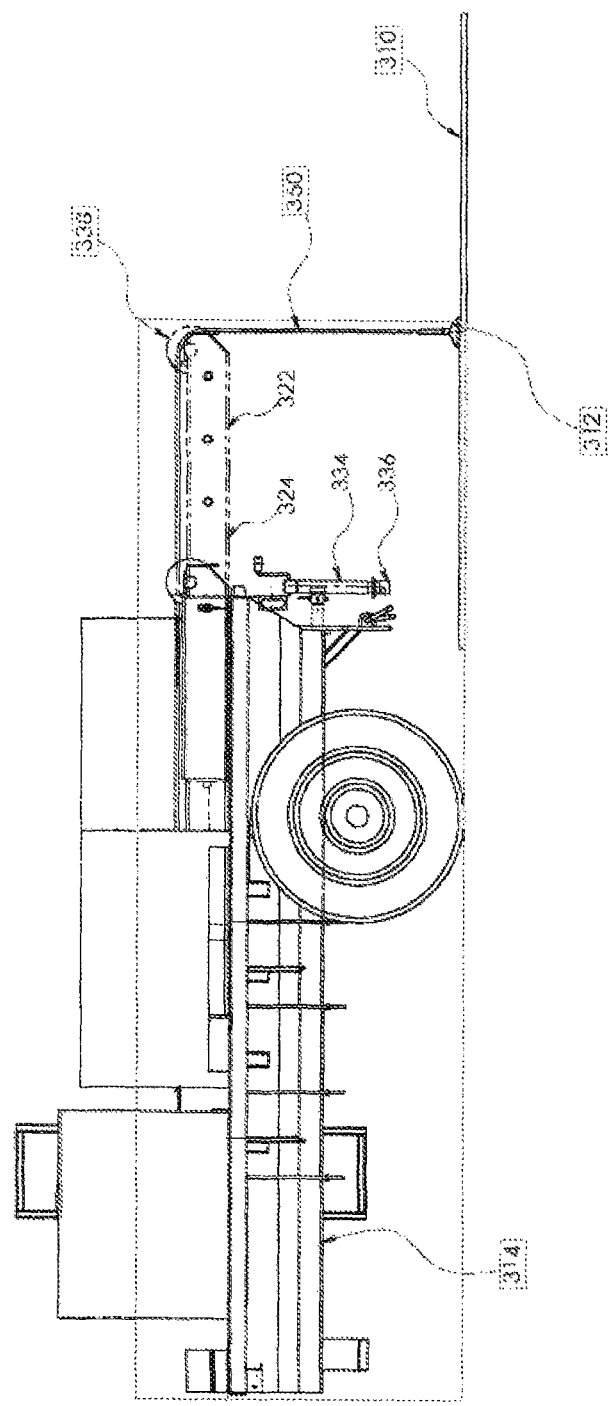
FIG. 11 is a side view of the third embodiment of the invention.

A third embodiment is illustrated in FIGS. 10 and 11. Turning to FIG. 10, there is a road plate 310 with a central attachment point 312. To assist in movement, road plates typically have a lifting ring attached at the centre of the plate. The movement apparatus includes a truck 314. U-channels 316 and 318 are attached to the bed 320 of the truck 314. In one embodiment, the u-channels 316 and 318 are welded to the bed 320 of the truck 314. In another embodiment, the u-channels 316 and 318 are bolted to the bed 320 of the truck 314. In a preferred embodiment, the u-channels 316 and 318 are bolted and welded to the bed 320 of the truck 314.

U-channels 316 and 318 contain extendible arms 322 and 324. A return roller 326 controls the extension of arms 322 and 324. Arms 322 and 324 are limited in their ability be extended and retracted by cross bar 328, which limits the retraction of arms 322 and 324, and hard stop 330, which limits both the extension and retraction of arms 322 and 324.

There is a guide roller 338 that is supported by a bar 340. The bar 340 and guide roller 338 are located at the back end of extendible arms 322 and 324.

The truck also contains a truck winch 332. The winch must have sufficient strength to lift road plates off the ground. In one embodiment, truck winch 332 is a 7 ton truck winch. A cable 350 (which in a preferred embodiment is a steel wire rope and in an alternative embodiment is a chain) is attached to and wound around truck winch 332 and threaded through guide roller 338. A detachable attachment mechanism 351 is at one end of cable 350 (which in a preferred embodiment is a steel wire rope and in an alternative embodiment is a chain), and is suitable to attach to and lift a road plate. In one embodiment, detachable attachment mechanism 351 is a hook for use in a hook and eye system. In another embodiment, detachable attachment mechanism 351 is a chain system that can be detachably attached to a centre ring on the road plate. In another embodiment, the detachable attachment mechanism 351 is an electromagnet.

At the back of the truck is leveling jack screw 334 with a manually activated detachable attachment mechanism 336. In a preferred embodiment, detachable attachment mechanism 336 is a magnet or electromagnet.

Turning to FIG. 11, in use, the extendible arms 322 and 324 are extended so that guide roller 338 is located approximately above central attachment point 312 of road plate 310. A cable 350 (which in a preferred embodiment is a steel wire rope and in an alternative embodiment is a chain) attached to truck winch 332 is threaded through guide roller 338 and detachably attached to central attachment point 312. Cable 350 (which in a preferred embodiment is a steel wire rope and in an alternative embodiment is a chain) is wound back by winch 332 raising road plate 310 off the ground. Once the road plate 310 is raised sufficiently off the ground, the jack screw 334 is used to adjust the height of the detachable attachment mechanism 336, and detachable attachment mechanism 336 attaches to the road plate 310, stopping the road plate 310 from swinging around.

The truck 314 then drives to the location to place the road plate 310.

The detachable attachment mechanism 336 is detached from the road plate and winch 332 is reversed, lowering the road plate 310 to the ground. Cable 350 (which in a preferred embodiment is a steel wire rope and in an alternative embodiment is a chain) is then detached from central attachment point 312.

In an alternative embodiment, the detachable attachment mechanism 336 is an electromagnet. In another alternative embodiment, the detachable attachment mechanism 336 is a magnet chosen to be of sufficient strength to attach to and hold road plate 310 and prevent road plate 310 from swinging during transport, but is weak enough to simply detach from road plate 310 when road plate 310 is lowered (or, equivalently, jack screw 334 is used to raise detachable attachment mechanism 336 away from road plate 310).

FIGS. 1 through 11 are conceptual illustrations allowing for an explanation of the present invention. Those of skill in the art should understand that various aspects of the embodiments of the present invention could be implemented using different materials, fasteners and minor design modifications. Notably, the figures and examples above are not meant to limit the scope of the present invention to a single embodiment, as other embodiments are possible by way of interchange of some of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention.

What is claimed is:

1. A portable system for moving a road plate, comprising:
    a vehicle provided with a winch and a cable, a first end of the cable being attached to the winch and the second end of the cable being fed through a guide roller and bearing a first detachable attachment mechanism for detachable attachment to a road plate;
    the vehicle being provided with at least one extension arm configured to extend the guide roller horizontally behind the vehicle, the at least one extension arm being long enough to extend the guide roller over the centre of a road plate; and
    the vehicle having a downward protruding member, the downward protruding member bearing a second detachable attachment mechanism for detachable attachment to the road plate.

2. The system of claim 1 where the cable is a steel wire rope.

3. The system of claim 1 where the cable is a chain.

4. The system of claim 2 where the downward protruding member comprises a jack screw.

5. The system of claim 4 where the second detachable attachment mechanism is an electromagnet.

6. The system of claim 4 where the second detachable attachment mechanism is an eye and hook mechanism.

7. The system of claim 4 where the second detachable attachment mechanism is a chain mechanism.

8. The system of claim 5 where the first detachable attachment mechanism is a chain mechanism.

9. The system of claim 5 where the first detachable attachment mechanism is an eye and hook mechanism.

10. The system of claim 5 where the first detachable attachment mechanism is a chain mechanism.

11. A method of moving a road plate, comprising:
    providing a vehicle provided with a winch and a cable, a first end of the cable being attached to the winch and the second end of the cable being fed through a guide roller and bearing a first detachable attachment mechanism for detachable attachment to a road plate; the vehicle being provided with at least one extension arm configured to extend the guide roller horizontally behind the vehicle, the at least one extension arm being long enough to extend the guide roller over the centre of a road plate; and the vehicle having a downward protruding member the downward protruding member bearing a second detachable attachment mechanism for detachable attachment to the road plate;
    wherein in operation:
    the at least one extension arm is extended to move the guide roller over the centre of a road plate;
    the cable is unrolled from the winch so as to allow the first detachable attachment mechanism to detachably attach to the road plate;
    detachably attaching the first detachable attachment mechanism to the road plate;
    the cable is rolled onto the winch so as to raise the road plate off the ground and allow the second detachable attachment mechanism to detachably attach to the road plate;
    detachably attaching the second detachable attachment mechanism to the road plate;
    driving the vehicle to a new location for the road plate.

12. The method of claim 11, further comprising:
    detaching the second detachable attachment mechanism from the road plate;
    rolling the cable off the winch to lower the road plate to the ground; and
    detaching the first datable attachment mechanism from the road plate.

13. The method of claim 12, where detachably attaching the second detachable attachment mechanism to the road plate comprises adjusting the height of the second detachable attachment mechanism and detachably attaching the second detachable attachment mechanism to the road plate.

14. The method of claim 12, where the downward protruding member comprises a jack screw and adjusting the height of the second detachable attachment mechanism comprises adjusting the height using the jack screw.

15. The method of claim 13, where the cable is a steel wire rope.

16. The method of claim 13, where the cable is a chain.

17. The method of claim 14 where the second detachable attachment mechanism is an electromagnet.

18. The system of claim 14 where the first detachable attachment mechanism is a chain mechanism.

19. The system of claim 14 where the first detachable attachment mechanism is an eye and hook mechanism.

20. The system of claim 14 where the first detachable attachment mechanism is a chain mechanism.

\* \* \* \* \*